United States Patent
Cohen et al.

(10) Patent No.: US 11,916,304 B2
(45) Date of Patent: Feb. 27, 2024

(54) CORRECTION OF SYSTEMATIC ERROR FOR ELECTRONICALLY STEERED ANTENNAS USING ON-CHIP PROGRAMMING

(71) Applicant: ANOKIWAVE, INC., San Diego, CA (US)

(72) Inventors: Lew Cohen, San Diego, CA (US); Jonathan Comeau, Billerica, MA (US); Vipul Jain, San Diego, CA (US)

(73) Assignee: ANOKIWAVE, INC., San Diego, CA (US)

( * ) Notice: Subject to any disclaimer, the term of this patent is extended or adjusted under 35 U.S.C. 154(b) by 138 days.

(21) Appl. No.: 17/709,271

(22) Filed: Mar. 30, 2022

(65) Prior Publication Data

US 2022/0320729 A1    Oct. 6, 2022

Related U.S. Application Data

(60) Provisional application No. 63/170,418, filed on Apr. 2, 2021.

(51) Int. Cl.
| | |
|---|---|
| *H01Q 3/34* | (2006.01) |
| *H01Q 3/26* | (2006.01) |
| *H01Q 3/38* | (2006.01) |
| *H01Q 21/24* | (2006.01) |
| *H04B 1/16* | (2006.01) |

(Continued)

(52) U.S. Cl.
CPC .............. *H01Q 3/34* (2013.01); *H01Q 3/2617* (2013.01); *H01Q 3/38* (2013.01); *H01Q 21/24* (2013.01); *H04B 1/1607* (2013.01); *H04B 1/18* (2013.01); *H04B 7/0617* (2013.01)

(58) Field of Classification Search
CPC .. H01Q 3/34; H01Q 3/36; H01Q 3/28; H01Q 3/40; H01Q 15/24; H01Q 3/38; H01Q 3/30; H01Q 1/288; H01Q 1/245; H01Q 3/267; H01Q 3/2658; H01Q 3/2611; H01Q 3/2694; H04B 1/1607; H04B 1/18; H04B 7/0617; H04B 17/12; H04B 17/21; H04B 17/11
See application file for complete search history.

(56) References Cited

U.S. PATENT DOCUMENTS

| | | | |
|---|---|---|---|
| 10,224,627 B2* | 3/2019 | Carey | ............... H01Q 3/38 |
| 10,587,044 B2* | 3/2020 | Jain | ............ H01L 23/49503 |

(Continued)

*Primary Examiner* — Vibol Tan
(74) *Attorney, Agent, or Firm* — Mintz Levin Cohn Ferris Glovsky and Popeo, P.C.

(57) ABSTRACT

A system and a method for performing correction of systematic error for electronically steered antennas using on-chip programming. A plurality of channels includes a first channel. Each channel is coupled to a respective antenna element and includes a trim control circuit and a phase control circuit. The first channel is coupled to a first respective antenna element. An array calibration memory stores a plurality of phase offsets including a first phase offset. Each phase offset includes an array level calibration phase offset corresponding to a respective channel. The first phase offset corresponds to the first channel. At least one of the trim control circuit and the phase control circuit of the first channel are configured to modify phase of a first signal provided to and/or received from the first respective antenna element. The phase of the first signal is modified based at least in part on the first phase offset.

13 Claims, 9 Drawing Sheets

(51) Int. Cl.
*H04B 1/18* (2006.01)
*H04B 7/06* (2006.01)

(56) References Cited

U.S. PATENT DOCUMENTS

| | | | | |
|---|---|---|---|---|
| 10,608,756 | B2* | 3/2020 | Jain | H03G 3/3052 |
| 10,924,164 | B2* | 2/2021 | Brunel | H04B 17/13 |
| 10,985,819 | B1* | 4/2021 | Durbin | H04B 7/0617 |
| 11,063,336 | B2* | 7/2021 | Madsen | H01Q 21/06 |
| 11,081,792 | B2* | 8/2021 | Jain | H01Q 3/2617 |
| 11,205,846 | B2* | 12/2021 | Greene | H01Q 23/00 |
| 11,251,836 | B2* | 2/2022 | Balteanu | H04B 7/0871 |
| 11,749,889 | B1* | 9/2023 | Thai | H01Q 21/24 |
| | | | | 343/702 |
| 2018/0234121 | A1* | 8/2018 | Corman | G06F 3/061 |
| 2021/0151876 | A1* | 5/2021 | Farsi | H04B 17/102 |
| 2021/0257731 | A1* | 8/2021 | Lin | H01Q 3/34 |

* cited by examiner

CORRECTION OF SYSTEMATIC ERROR FOR ELECTRONICALLY STEERED ANTENNAS USING ON-CHIP PROGRAMMING

CROSS-REFERENCE TO RELATED APPLICATIONS

The present application claims priority to U.S. Provisional Patent Application No. 63/170,418 to Cohen et al., filed on Apr. 2, 2021, and entitled "Correction Of Systematic Error For Electronically Steered Antennas Using On-Chip Programming," and incorporates its disclosure herein by reference in its entirety.

TECHNICAL FIELD

This disclosure generally relates to active electronically steered antenna systems and, more particularly, to integrated circuits used in active electronically steered antenna systems.

BACKGROUND

An active electronically steered antenna array may be used to generate direction-controlled beams, which may be useful in radar systems, communications systems, and/or other radio-based systems. Calibration of the beam-forming antennas may involve additional hardware and/or processing during operation. In some aspects, calibration may include involve periodic and/or continual monitoring, measuring, processing, and application of modifications to signals for each antenna in the array.

SUMMARY

Aspects of the current disclosure relate to correction of systematic errors for electronically steered antennas using on-chip programming.

In some example embodiments, the current subject matter relates to an apparatus, that, for example, may be implemented to correct systematic errors for electronically steered antennas using on-chip programming. The apparatus may include a plurality of channels including a first channel. Each of the plurality of channels may be coupled to a respective antenna element. Each of the plurality of channels may include a trim control circuit and a phase control circuit. The first channel may be coupled to a first respective antenna element. The apparatus may also include an array calibration memory storing a plurality of phase offsets including a first phase offset. Each of the plurality of phase offsets may include an array level calibration phase offset corresponding to a respective channel of the plurality of channels. The first phase offset corresponding to the first channel of the plurality of channels. At least one of the trim control circuit of the first channel and the phase control circuit of the first channel may be configured to modify a phase of a first signal provided to and/or received from the first respective antenna element. The phase of the first signal being modified based at least in part on the first phase offset.

In some example embodiments, the current subject matter may include one or more of the following optional features. Each of the plurality of channels may include a gain control circuit. The array calibration memory may store a plurality of gain offsets including a first gain offset, each of the plurality of gain offsets comprising an array level calibration gain offset corresponding to a respective channel of the plurality of channels. The first gain offset may correspond to the first channel of the plurality of channels. Each of the plurality of channels may include a gain control circuit, the trim control circuit of the first channel, and/or the gain control circuit of the first channel being configured to modify a gain of the first signal provided to and/or received from the first respective antenna element. The gain of the first signal may be further modified based at least in part on the first gain offset.

In some example embodiments, the apparatus may also include at least one processor and at least one memory including computer program code configured to receive, from a calibration system, a plurality of array level calibration vectors, each of the plurality of array level calibration vectors including a phase offset and a gain offset corresponding to a respective channel of the plurality of channels, and store, in the array level calibration memory, the plurality of calibration vectors.

In some example embodiments, the current subject matter relates to a method that, for example, may be implemented to correct systematic errors for electronically steered arrays using on-chip programming. In the method, a plurality of signals including a first signal may be received at a beam forming integrated circuit. The beam forming integrated circuit may include a plurality of channels including a first channel. Each of the plurality of signals may be received from and/or provided to a respective channel of the plurality of channels. Each of the plurality of channels may be coupled to a respective antenna element. The first channel may be coupled to a first respective antenna element. The beam forming integrated circuit may include an array level calibration memory. The array level calibration memory may include a plurality of phase offsets including a first phase offset. Each of the plurality of phase offsets may include an array level calibration phase offset corresponding to a respective channel of the plurality of channels. The first phase offset may correspond to the first channel of the plurality of channels. The method may also include modifying a phase of the first signal by the beam forming integrated circuit based at least in part on the first phase offset stored in the array level calibration memory.

In some example embodiments, the current subject matter may include one or more of the following optional features. The array calibration memory may store a plurality of gain offsets including a first gain offset. Each of the plurality of gain offsets may include an array level calibration gain offset corresponding to a respective channel of the plurality of channels. The first gain offset may correspond to the first channel of the plurality of channels. The process may further include modifying, by the beam forming integrated circuit, based at least in part on the first gain offset, a gain of the first signal provided to and/or received from the first respective antenna element. The process may also include receiving, at the beam forming integrated circuit from a calibration system, a plurality of array level calibration vectors, each of the plurality of array level calibration vectors comprising a phase offset and a gain offset corresponding to a respective channel of the plurality of channels, and storing, by the beam forming integrated circuit, in the array level calibration memory, the plurality of calibration vectors.

Systems, methods, and articles of manufacture, including computer program products, are provided for the correction of systematic error for electronically steered antennas using on-chip programming.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

When practical, similar reference numbers denote similar structures, features, or elements.

DETAILED DESCRIPTION

Figure 1:
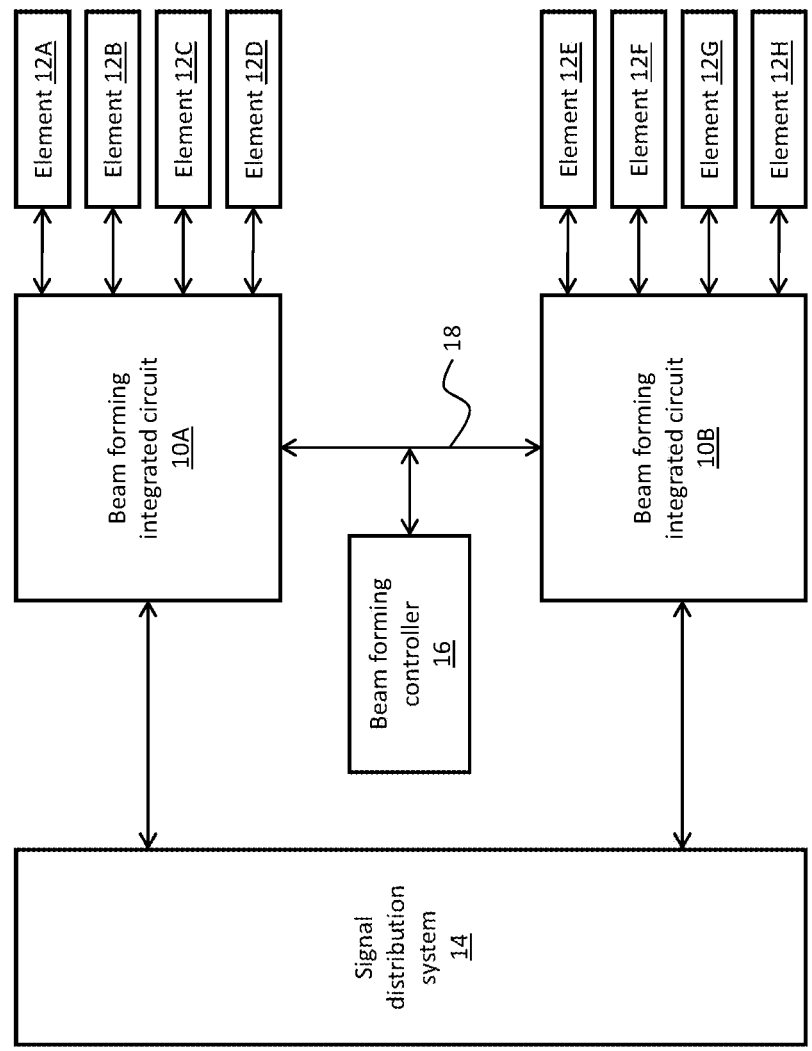
FIG. 1 illustrates an example block diagram of an active electronically steered antenna system, in accordance with some example embodiments.

An active electronically steered antenna system, which may also be referred to as a phased array and/or an antenna array, may frequently change its mode of operation during use. For example, the system may rapidly change the direction of the beam, the shape of the beam, the orientation of the beam, and/or other beam characteristics during the reception and/or transmission of a signal. The system may include one or more antenna elements electrically coupled to beam-forming integrated circuits. The beam-forming integrated circuits may control the beam characteristics of signals transmitted or received by the antenna elements. A beam-forming circuit and one or more antenna elements may be part of the same integrated circuit. Alternatively and/or additionally, a beam-forming integrated circuit may be mounted to a printed circuit board that includes one or more antenna elements. Alternatively and/or additionally, a beam-forming integrated circuit may be mounted to a printed circuit board and one or more antenna elements may be mounted to other printed circuit boards. The beam-forming integrated circuits may compensate for various factors that may affect beam characteristics, including temperature fluctuations, variations due to the integrated circuit manufacturing process, as well as other factors.

The configuration of the antenna array, including the layout and/or manufacture of the printed circuit boards and/or the connections between the beam-forming integrated circuits and the antenna elements, may introduce implementation-specific variations in the beam characteristics, which may be referred to as array-level variations. Array-level variations may be due to various factors including, for example, the relative position of one beam-forming integrated circuit to another on a printed circuit board layout, the placement of a beam-forming integrated circuit on a printed circuit board during the manufacture of the printed circuit board, the length and/or route of traces coupling the beam-forming integrated circuits to the antenna elements and/or other circuits on the printed circuit board, the proximity of other circuits to a beam-forming integrated circuit and/or an antenna element, and/or the like.

According to some example embodiments, array-level calibration may be provided to compensate for some of the above-noted and/or other array-level variations that may affect beam characteristics. The system may include one or more array calibration memories. During array-level calibration of the antenna array, a calibration system may determine calibration values that compensate for the noted array-level variations in the beam characteristics. The calibration values may be stored in the array-level calibration memory. The beam-forming integrated circuits may apply the array-level calibration values to reduce and/or minimize errors in the beam characteristics, such as amplitude errors and/or phase errors in the signals transmitted or received by the antenna elements. As such, the modified signals may compensate for array-level variations in the beam characteristics. The calibration system may be operated by a customer. As used herein, a customer may refer to an organization involved in the manufacture and/or deployment of active electronically steered antenna systems.

FIG. 1 depicts an example block diagram of an active electronically steered antenna system 100, in accordance with some example embodiments. The active electronically steered antenna system 100 may include a beam-forming controller 16, one or more beam-forming integrated circuits 10A-10B, one or more antenna elements 12A-12H, one or more signal distribution systems 14, and one or more beam-forming controllers 16. The beam-forming integrated circuits 10A-10B, the antenna elements 12A-12H, the signal distribution system 14, and the beam-forming controller 16 may be implemented on the same or separate integrated circuits, including application specific integrated circuits (ASICs), field programmable gate arrays (FPGAs), and/or the like. Each beam-forming integrated circuit 10A-10B may be electrically coupled to one or more beam-forming elements 12A-12H (e.g., radio frequency antennas for operation in a radar system, a communications system, and/or the like.)

As depicted in the example of FIG. 1, the active electronically steered antenna system 100 includes two beam-forming integrated circuits 10A-10B. Each beam-forming integrated circuit 10A-10B is coupled to one or more beam-forming elements 12A-12H. According to this example, the first beam-forming integrated circuit 10A is electrically coupled to a first group of beam-forming elements 12A-12D.

As depicted in the example of FIG. 1, the active electronically steered antenna system 100 includes the second beam-forming integrated circuit 10B, which is electrically coupled to a second group of beam-forming elements 12E-12H. The active electronically steered antenna system 100 may include any number of signal distribution systems 14, any number of beam-forming controllers 16, and any number of beam-forming integrated circuits 10A-10B.

Each of the beam-forming integrated circuits 10A-10B may be electrically coupled to any number of beam-forming elements 12A-12H. The active electronically steered antenna system 100 may transmit and/or receive signals via the beam-forming elements 12A-12H.

The signal distribution system 14 may be electrically coupled to the beam-forming integrated circuits 10A-10B. The signal distribution system 14 may distribute signals to each of the beam-forming integrated circuits 10A-10B. The signal distribution system 14 may also receive signals from each beam-forming integrated circuit 10A-10B and combine those signals.

The beam-forming controller 16 may be electrically coupled to the beam-forming integrated circuits 10A-10B via a control bus 18. The control bus 18 may be implemented as a serial bus and/or a parallel bus. The beam-forming controller 16 may broadcast messages via the control bus 18 to the beam-forming integrated circuits 10A-10B. By broadcasting messages via the control bus 18, the beam-forming controller 16 may transmit (e.g., in parallel or at about the same time) control messages to some, if not all, of the beam-forming integrated circuits 10A-10B connected to the control bus 18. The types of control messages may include beam-switching messages, beam-steering messages, temperature compensation messages, and/or the like. The control messages (including the beam-steering messages, beam-switching messages, and/or the like) may include operating parameters. The beam-switching messages may be referred to as fast beam-switching messages. The beam-steering messages may be referred to as three-dimensional beam-steering messages. The beam-steering messages (including the three-dimensional beam-steering messages) may include parameters that direct (e.g., steer) the beam toward a particular point in space. The beam-forming integrated circuits 10A-10B may receive the control messages from the beam-forming controller 16. The beam-forming integrated circuits 10A-10B may obtain the operating parameters from a control message use the operating parameters to modify the characteristics of the signals transmitted and/or received by the antenna elements 12A-12H. The characteristics of the signals modified by the operating parameters may include beam direction, beam shape, beam weighting parameters, and/or the like.

Figure 2:
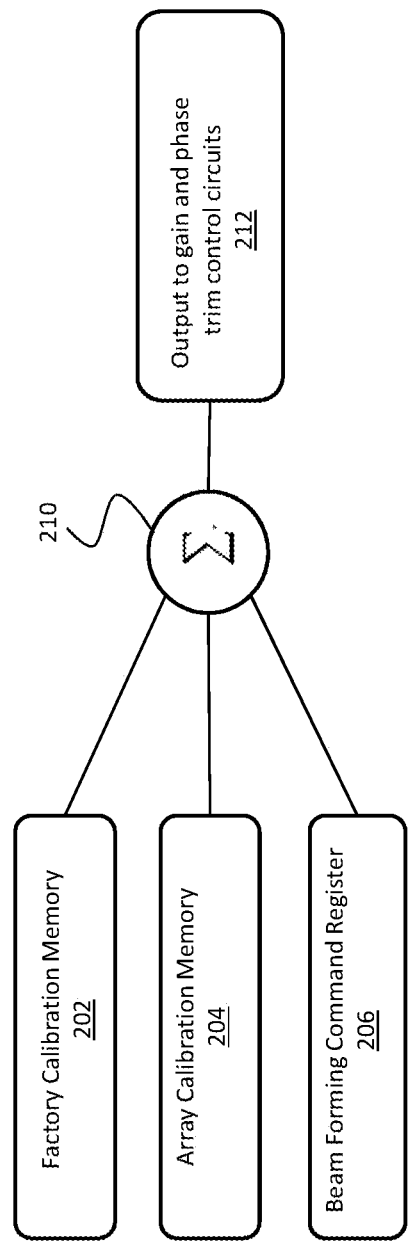
FIG. 2 illustrates an example flow diagram, in accordance with some example embodiments.

FIG. 2 depicts an example flow diagram of a process 200 performed at beam-forming integrated circuit, in accordance with some example embodiments. The process 200 may be performed by a digital control block of the beam-forming integrated circuit 10A-10B. The beam-forming integrated circuit 10A-10B may include a factory calibration memory 202, an array calibration memory 204, and/or a beam-forming command register 206. Alternatively and/or additionally, the digital control block (which may be included in the beam-forming integrated circuit 10A-10B) may include the factory calibration memory 202, the array calibration memory 204, and/or the beam-forming command register 206. Values stored in the factory calibration memory 202, the array calibration memory 204, and the beam-forming command register 206 may be combined to produce an output value 212. For example, digital control bock may calculate the output value 212 as a combination (e.g., a sum) 210 of the values stored in the factory calibration memory 202, the array calibration memory 204, and the beam-forming command register 206.

The factory calibration memory 202 may store calibration values that compensate for factors that affect beam characteristics, including variations due the integrated circuit manufacturing process. The factory calibration memory 202 may include a non-volatile memory, such as a one-time programmable memory, that stores a factory calibration vector for each channel of the beam-forming integrated circuit 10A-10B. The factory calibration vector for each channel may include a gain offset, a phase offset, and/or the like. The values stored in the factory calibration memory 202 may be used to calculate the offset 212 of the digital control block 200.

The array calibration memory 204 may include an array-level calibration vector for each channel of the beam-forming integrated circuit 10A-10B. The values stored in the array calibration memory 204 may be used to compensate for array-level variations in the beam characteristics of the active electronically steered antenna system 100. As noted, the array-level variations may be due to the relative position of beam-forming integrated circuits to each other on a printed circuit board, the placement of a beam-forming integrated circuit during the manufacture of the antenna array, the length and/or route of traces and/or electrical conductors coupling each beam-forming integrated circuit to other circuits and/or antenna elements on the same or other printed circuit boards, the proximity of a beam-forming integrated circuit or an antenna element to other circuits, and/or the like. The values stored in the array calibration memory 204 may be provided by a calibration system operated by a customer, allowing the customer to reduce and/or minimize array-level errors in the beam characteristics of the active electronically steered antenna system. The array-level calibration may be performed during and/or after the manufacture of the active electronically steered antenna system 100.

In order to form a beam that spatially points in a given direction, the active electronically steered antenna system 100 may apply beam steering such that the energy from each radiating element 12A-12H is combined coherently (e.g., in-phase, amplitude, and/or vector alignment) in a region of the antenna array's far field. In order to compensate for array-level errors in the beam, an array-level calibration procedure may be performed using a calibration system that includes one or more reference standards. A reference standard may include a reference antenna coupled to a reference transmitter and/or reference receiver. The reference standards may be used to transmit and/or receive reference signals to and/or from the antenna array. The array-level calibration procedure may be performed automatically, such as when the antenna array is powered up, periodically during the operation of the antenna array, and/or at other times as well.

During array-level calibration, each reference standard may be placed at a pre-determined position and orientation relative to the antenna array. With the antenna array in a transmit mode, the antenna array may be configured to transmit a reference signal toward a target reference standard (e.g. in a specified beam direction and using a specified beam shape). The target reference standard may receive the reference signal from the antenna array. Based on the signal received by the target reference standard, the calibration system may calculate a vector error for the beam. Based on the vector error, the calibration system may calculates an array calibration vector for each element of the antenna array and store the array calibration vectors in the array calibration memory 204. Similarly, with the antenna array in a receive mode, a source reference standard may transmit a reference signal. The reference signal may be received by the antenna array. The calibration system may calculate, based on the received reference signal, a vector error. The calibration system may calculate array calibration vectors for each element of the antenna array, and store the array calibrations vectors in the array calibration memory 204.

A calibration facility may have reference standards placed in the near field and far field of the antenna array. For example, the reference standards may be placed at an elevation angle of 10% and 90% of a specified operating elevation range of the antenna array, at 10% and 90% of a specified operating azimuth angle of the array, and at 10% and 90% of a specified operating distance from the antenna array. In some embodiments, more or fewer reference standards may be used, and each reference standard may be placed in any position relative to the antenna array.

In some embodiments, array-level calibration may be performed in an enclosed space, such as a shielded enclosure, an anechoic chamber, and/or the like. Alternatively and/or additionally, array-level calibration may be performed in an outdoor facility, in the field, and/or the like.

Alternatively and/or additionally, array-level calibration may be performed using in-situ calibration, which may include providing a feedback path from each antenna element to a single calibrated receiver. A calibration system may calculate an error vector based on the difference between the desired beam characteristics and the beam characteristics measured by the calibrated receiver. Based on the error vector, the calibration system may generate array-level calibration offsets, such as phase offsets and gain offsets, for each antenna element, causing the beam characteristics, such as phase and amplitude, to be aligned.

Moreover, the array calibration vector may be known a priori by design. For example, the geometry and/or layout of the antenna array may introduce longer or shorter paths between each of the components of the antenna array. These differences in path length may be calculated and stored as array calibration vectors.

The beam-forming command register 206 may store banks (e.g., groups) of command vectors associated with various characteristics, including beam direction, beam shape, beam orientation, and/or the like.

During initialization, the beam-forming controller 16 may store banks (e.g. groups) of command vectors in the beam-forming command register 206 at each beam-forming integrated circuit 10A-10B. Each bank of command vectors may be associated with a particular set of beam characteristics, such has beam direction, beam shape, orientation, and/or the like. Each bank of command vectors may include a command vector for each channel of the beam-forming circuit 10A-10B. Each command vector may include a gain, a phase, and/or other parameters for a channel of the beam-forming integrated circuit 10A-10B. The beam-forming integrated circuit 10A-10B may receive a broadcast message from the beam-forming controller 16. The broadcast message 208 may include an address that identifies a bank of command vectors representing desired beam characteristics of the active electronically steered antenna system 100.

Based on the values stored in the factory calibration memory 202 and the array calibration memory 204, the beam-forming integrated circuit 10A-10B may provide compensation for the signals received and/or transmitted by each element 12A-12H of the antenna array. The compensation may include compensation for an error vector magnitude, output power at 1-dB compression, power detection accuracy, as well as the gain and phase in each element. For example, during operation of the antenna array, the phase and gain output 212 for each element may be determined based upon the factory calibration data from the factory calibration memory 202, the array calibration data from the array calibration memory 204, and the command data from the beam-forming command register 206.

Figure 3:
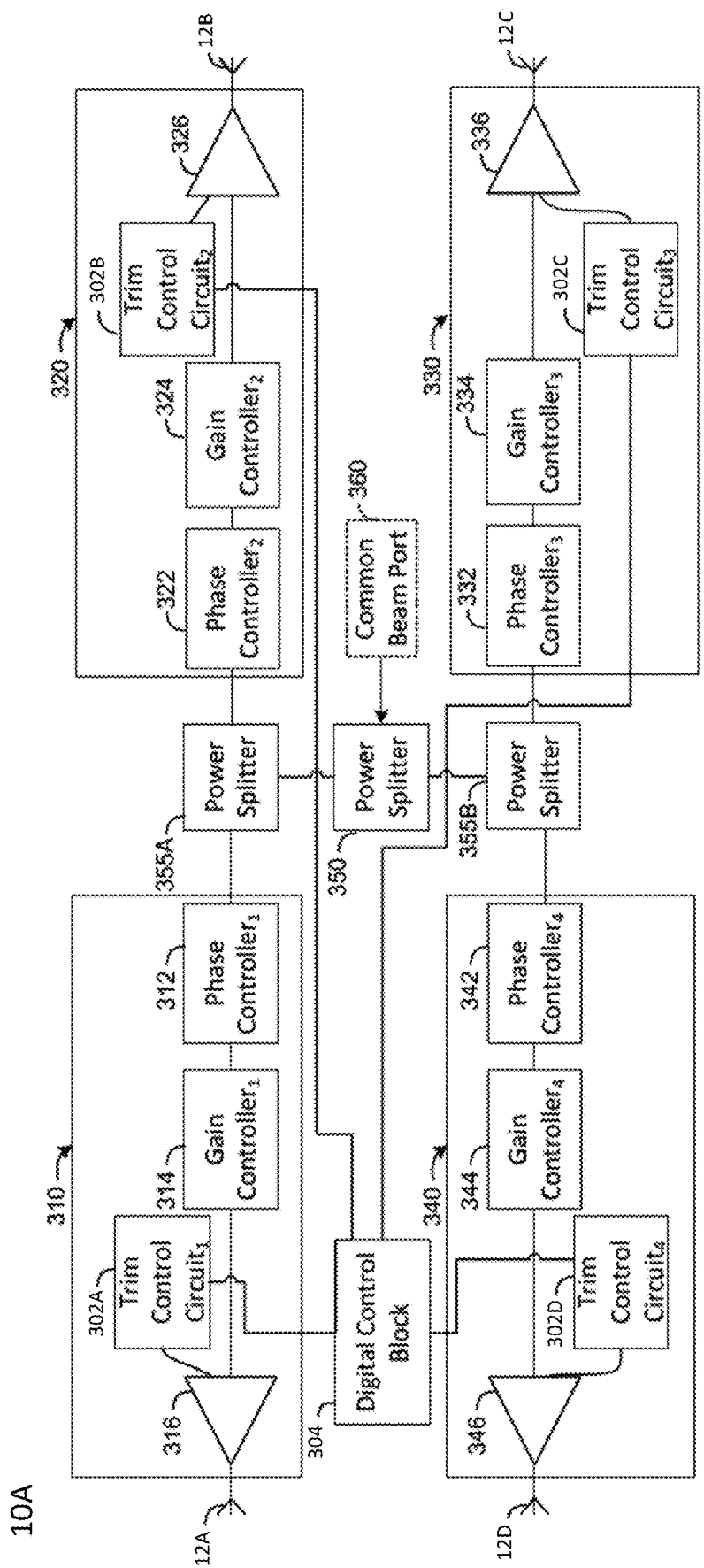
FIG. 3 illustrates an example block diagram of a beam-forming integrated circuit, in accordance with some example embodiments.

FIG. 3 depicts a block diagram of an example of a transmit beam-forming integrated circuit 10A that may be included in the active electronically steered antenna array 100. The beam-forming integrated circuit 10A may be referred to as, or may be a part of a beam-forming network. The beam-forming integrated circuit 10A may be implemented as one or more integrated circuits. The beam-forming integrated circuit 10A may include channels for a four-element antenna array, with element arms 310, 320, 330 and 340. The components for the element arm 310 are labeled with a subscript of 1. The element arm 310 may include a phase controller$_1$ 312, a gain controller$_1$ 314, a trim control circuit$_1$ 302A, and a power amplifier$_1$ 316 connected to the antenna element 12A. The phase controller$_1$ 312, gain controller$_1$ 314, and power amplifier$_1$ 316 may be connected in series. The trim control circuit$_1$ 302A may be connected to the power amplifier$_1$ 316. The trim control circuit$_1$ 302A may also be connected to a digital control block 304. The element arm 310 may receive a signal from the power splitter 355A.

The other element arms 320, 330, 340 may include the same or similar components in the same or similar layout as the first element arm 310. The element arms 320, 330, and 340 may include phase controllers 322, 332, and 342, gain controllers 324, 334, and 344, trim control circuits 302B, 302C, and 302D, and/or power amplifier 326, 336, and 346, respectively. The phase controllers 322, 332, and 342, gain controllers 324, 334, and 344, power amplifiers 326, 336, and 346, and antenna elements 12B, 12C, and 12D, respectively, may be connected in series. The trim control circuits 302B, 302C, and 302D, respectively, may be connected to power amplifiers 326, 336, and 346, respectively. The element arm 320 may receive a signal from a power splitter 355A. The element arms 330 and 340 may receive signals from another power splitter 355B. The trim control circuits 302B-302D are may also be connected to the digital control block 304.

The beam-forming integrated circuit 10A-10B may include the factory calibration memory 202, the array calibration memory 204, and/or the beam-forming command register 206. Alternatively and/or additionally, the digital control block 304 (which may be included in the beam-forming integrated circuit) may include the factory calibration memory 202, the array calibration memory 204, and/or the beam-forming command register 206.

Although the example of FIG. 3 depicts a beam-forming integrated circuit 10A with four channels and/or element arms, the beam-forming integrated circuit 10A may support any number of channels and/or element arms. Alternatively or additionally, some embodiments may include, additional, fewer, and/or alternative components within the beam-forming integrated circuit 10A. In some embodiments, the beam-forming integrated circuit 10A may include at least one receiver connected to at least one of the antenna elements 12A-12D.

The power splitters 355A and 355B may receive a signal from another power splitter 350. A common beam port 360 may provide a signal to the power splitter 350. The power splitter 350 may split the signal power in half, and route each half to the other power splitters 355A and 355B. The power splitter 355A may then split the signal power received from the power splitter 350 in half, and route each half to the element arms 310 and 320. Similarly, the power splitter 355B may split the signal power received from power splitter 350 in half, and route each half to the element arms 330 and 340. In some embodiments, the beam-forming integrated circuit may include more or fewer power splitters.

The output of the power amplifier 316, 326, 336, and 346 of each element arm 310, 320, 330, and 340 may be coupled to the antenna elements 12A, 12B, 12C, and 12D, respectively. The beam-forming integrated circuit 10A may include, as part of the same integrated circuit, the antenna elements 12A-12D. As such, the beam-forming integrated circuit 10A and the antenna elements 12A-12D may be fabricated as part of the same integrated circuit. Alternatively and/or additionally, the antenna elements 12A-12D may be separate from the beam-forming integrated circuit 10A. For example, the same or different printed circuit boards may include the beam-forming integrated circuit 10A and the antenna elements 12A-12D. As noted, beam-forming integrated circuit 10A may control the gain and phase of each antenna element to produce a desired beam characteristic in the antenna far field. Taken together, the phase and gain may be referred to as a complex beam weight for each element 12A-12D. A difference between a desired phase and a measured phase may be referred to as a phase error. A difference between a desired amplitude and a measured amplitude may be referred to as an amplitude error. A phase error combined with an amplitude error may be referred to as a vector error. A vector error, including a phase error and/or an amplitude error, may cause a misalignment of the beams transmitted and/or received by the active electronically steered antenna system 100. Vector errors, including phase errors and amplitude errors, may be reduced and/or minimized by performing array-level calibration of the active electronically steered antenna system.

The trim control circuits 302A-302D may each receive trim control bits from digital control block 304. Each trim control bit may open or close a switch (e.g., a transistor) to adjust a bias of the power amplifiers 316, 326, 336, and 346.

In some embodiments, the trim control circuits 302A, 302B, 302C, and 302D may be connected to at least one of the power gain controllers 314, 324, 334, and 344. In some embodiments, the trim control circuits 302A, 302B, 302C, and 302D may be connected to a corresponding phase controller 312, 322, 332, and 342. In some embodiments, a trim control circuit 302A, 302B, 302C, and 302D may adjust other tunable parameters in at least one of the power amplifiers 316, 326, 336, and 346, the gain controllers 314, 324, 334, 344, and/or the phase controllers 312, 322, 332, and 342. In some embodiments, the trim control circuits 302A, 302B, 302C, and 302D may adjust at least one of a bias, a gain, a power level, an error vector measurement, a phase, a resistance, a capacitance, and a frequency response.

In some embodiments, the trim control circuits 302A-302D may adjust tunable parameters such that an error vector magnitude for the output power of output signals from an array of antenna elements, for which the antenna elements in the array emit a substantially constant output power.

In some embodiments, the trim control circuits 302A-302D may adjust tunable parameters to maximize output power from an array of antenna elements for a substantially constant error vector magnitude for the antenna elements in an array.

In some embodiments, the trim control circuits 302A-302D may adjust tunable parameters such that an output power at 1-db compression of the output signals of the antenna elements in the array are substantially equal.

The beam-forming integrated circuit 10A may form at least a portion of the active electronically steered antenna array system 100. The active antennas may produce electronically steerable beams, which may be used in radar systems, communications systems, radio systems, and/or the like. In order to form a beam that spatially points in a given direction, beam steering may be applied such that energy from each radiating element may combine coherently (e.g., in-phase, amplitude, and/or vector alignment) in the antenna's far field.

According to some example embodiments, the active electronically steered antenna array and/or beam-forming integrated circuit may include other components, such as a down-converting mixer, an up-converting mixer, synthesizer, and/or the like.

Active antennas may implement beam steering by providing a unique radio frequency phase shift and/or gain setting between each radiating element and a beam summation point. In some aspects, the beam summation point may be a point at which all of the signals generated by the active antenna converge, which may form a steerable beam. Thus, emission of separate radio wave signals, which constructively interfere which each other, may be used to steer a radio signal. However, in order to achieve effective beam forming, the energy from each element in the active antenna should arrive at the beam summation point at the same phase (e.g., via phase control), the same amplitude (e.g., via gain control), and/or the same vector orientation. In some implementations, a gain taper may be used to improve the beam characteristics. Tapering may be used to reduce side lobes and/or to create nulls the antenna array pattern. These well-defined patterns may require accurate array-level calibration of phase and gain.

Factory calibration of the beam-forming integrated circuit may be used to compensate for errors that are due to variations in the manufacture of the integrated circuits. Elimination of high phase variation and/or gain variation may be provided by correcting for variations on the beam-forming integrated circuit. In some implementations, a system may measure a gain and a phase of each path within the integrated circuit. For example, a membrane probe may be used to measure the gain and/or phase differences between an input to a path and an output of the path (e.g., via one or more of the element arms 310, 320, 330, 340). The measurement process may be automated. Thereafter, based on the measurements, the system may program corrective calibration coefficient data into the factory calibration memory of the beam-forming integrated circuit. For example, programming the factory calibration memory may include burning fuses of a non-volatile memory, programming a one-time programming (OTP) memory, programming an electrically erasable programmable read-only memory (EEPROM), and/or other similar techniques. In some aspects, the programming procedure(s) may also be automated.

In some aspects, correlation within a given die may negate the need to measure all paths within that die. For example, measurement of only one path and programming of the same calibration data into all paths may be implemented (e.g., to reduce integrated circuit test time). Additionally or alternatively, a process of reducing cost may leverage the high level of correlation of integrated circuits within a given wafer. For example, in some aspects, a system may be configured to measure only one part (e.g., one integrated circuit or die) per wafer and/or program all dies of the wafer with the same factory calibration values. Additionally or alternatively, a system may be configured to measure a sample of integrated circuits (e.g., dies) on a given wafer and/or program all integrated circuits from that wafer, calculate average calibration coefficients, and store the average calibration coefficients as factory calibration data in the factory calibration memory 202.

Figure 4:
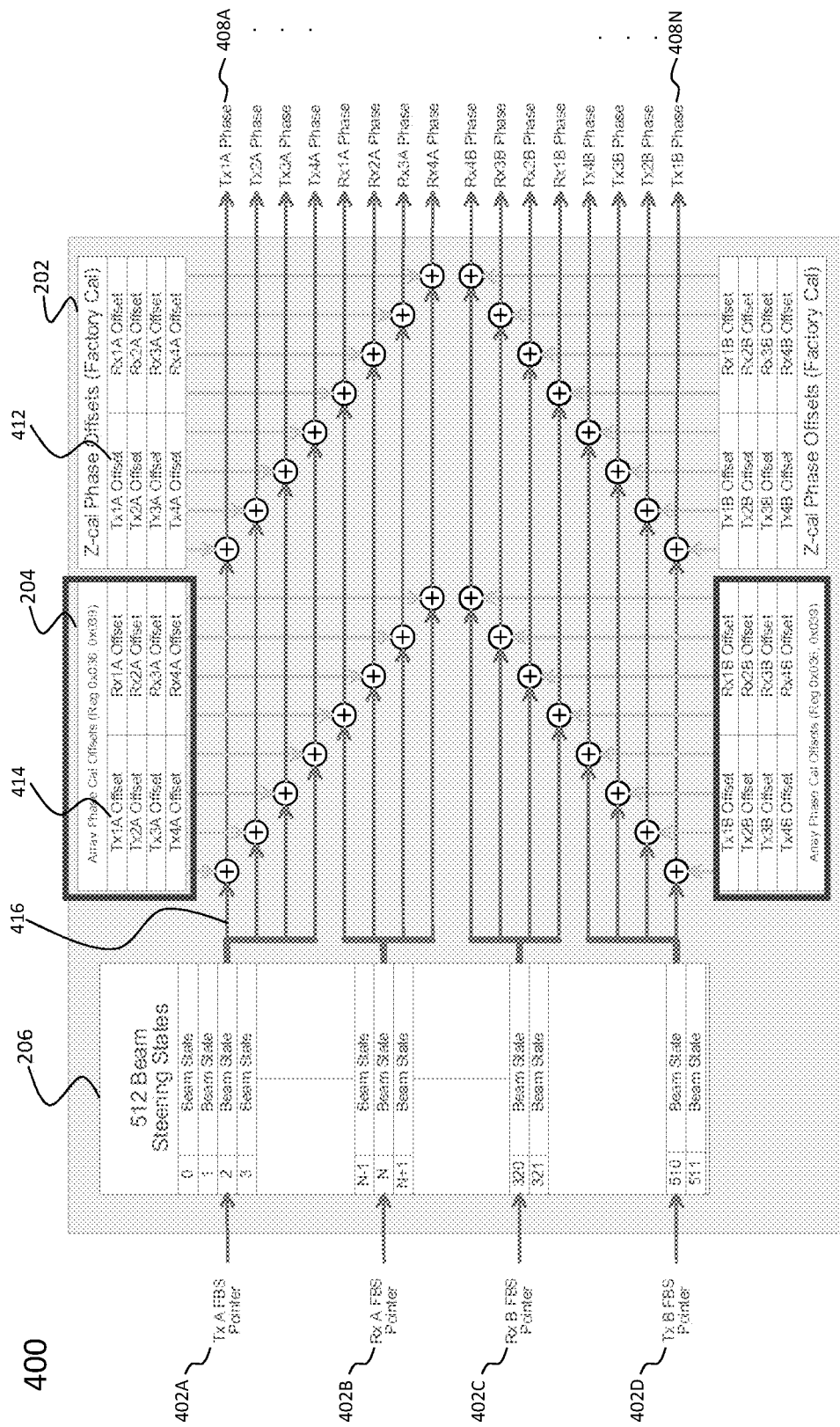
FIGS. 4 and 5 illustrate example block diagrams, in accordance with some example embodiments.

FIG. 4 depicts a block diagram 400 of phase calculations performed by the beam-forming integrated circuit 10A-10B, in accordance with some example embodiments. The phase calculations may produce one or more phase output values 408A-408N. Each phase output value 408A-408N may be provided to (e.g., output to) a corresponding element arm of the beam-forming integrated circuit (e.g., element arm 310, 320, 330, and/or 340 as depicted in the example of FIG. 3.) Each phase output value 408A-408N may be provided to the trim control circuit (e.g., 302A-302D) and/or the phase control circuit (e.g., 312, 322, 332, 342) of the corresponding element arm. The phase output values 408A-408N may modify (e.g., offset or adjust) a phase of a signal transmitted and/or received by the corresponding element arm. The phase calculations may be performed, for example, by the digital control block 304 of the beam-forming integrated circuit. The digital control block may receive, e.g., from the beam-forming controller 16, a beam-switching message. The digital control block may obtain, from the beam-switching message, one or more beam-switching addresses 402A-402D. The digital control block may use the beam-switching addresses 402A-402D to obtain, from the beam-forming command register 206, one or more phase command values.

The beam-forming integrated circuit may include the factory calibration memory 202, the array calibration memory 204, and/or the beam-forming command register 206. Alternatively and/or additionally, the digital control block (which may be included in the beam-forming integrated circuit) may include the factory calibration memory 202, the array calibration memory 204, and/or the beam-forming command register 206.

The beam-forming command register 206 may store one or more banks of phase command values. Each bank of phase command values may be associated with a desired beam characteristic of the antenna array. For example, to achieve a particular phase at a particular point in space, the beam-forming command register 206 may include a first bank of phase command values. To achieve a different phase at the same point in space, the beam-forming command register 206 may include a second bank of phase command values. Each bank of phase command values may include one or more phase command values corresponding to each element arm of the beam-forming integrated circuit. Each bank of phase command values may be associated with a particular beam-switching address.

As noted, the digital control block may obtain, e.g., from a beam-switching message, the beam-switching addresses 402A-402D. The digital control block may, based on each beam-switching address 402A-402D, select a bank of phase command values stored in the beam-forming command register 206. The digital control block may, based on the selected bank of phase command values, obtain one or more phase command values from the beam-forming command register 206. The digital control block may calculate the phase output values 408A-408N as a combination (e.g., a sum) of the phase command values, phase offset values from the array calibration memory 204, phase offset values from the factory calibration memory 202, and/or the like. The digital control block may provide the calculated phase output values 408A-408N to the components of the corresponding element arm of the beam-forming integrated circuit, such as the trim control circuit and/or the phase control circuit to modify and/or adjust the phase of the signal transmitted and/or received by the corresponding element arm.

For example, the digital control block may obtain, based on the beam-switching address 402A, a phase command value 416 from a bank of phase command values stored in the beam-forming command register 206. The digital control block may calculate the phase output value 408A as a sum of the phase command value 416, a phase offset value 414 from the array calibration memory 204, a phase offset value 412 from the factory calibration memory 202, and/or the like.

Figure 5:
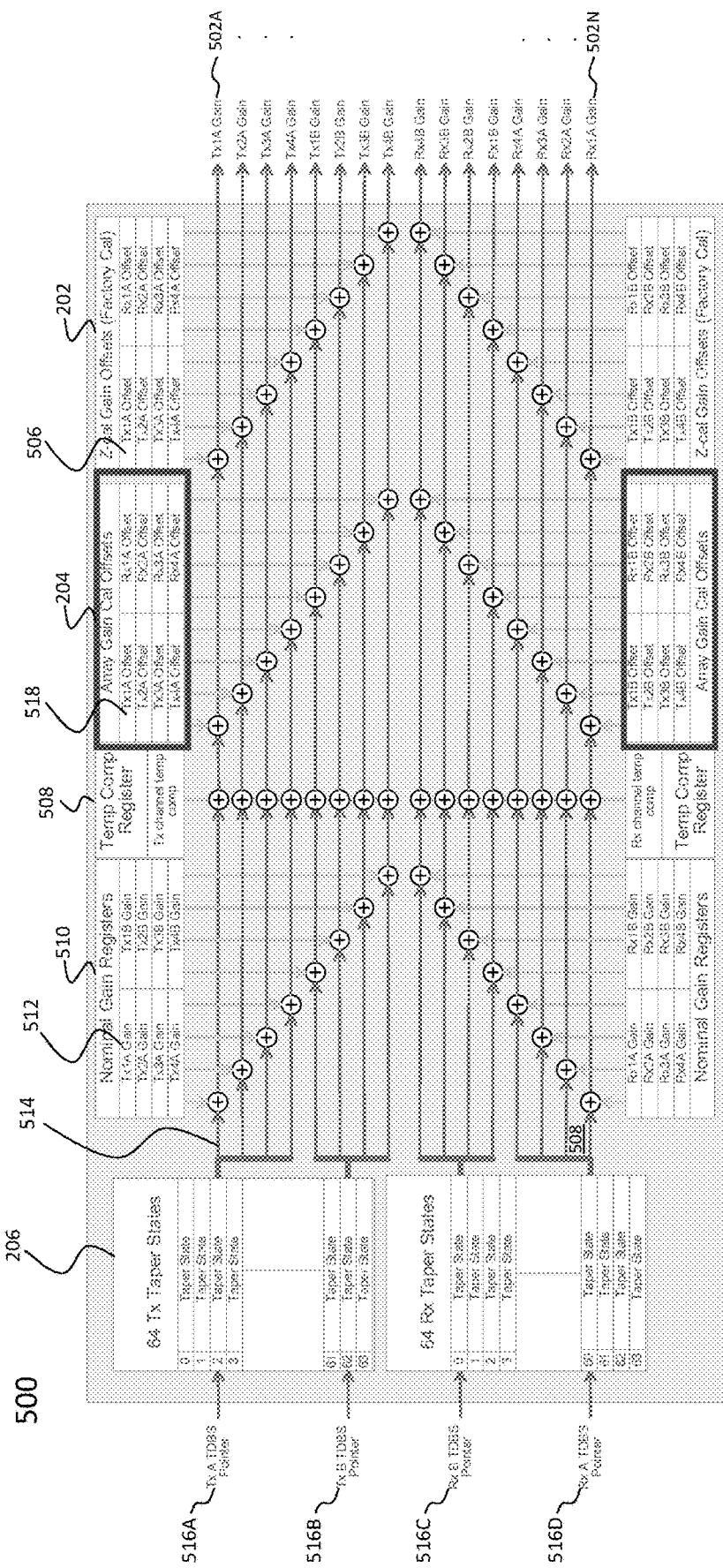

FIG. 5 depicts a block diagram 500 of gain calculations performed by the beam-forming integrated circuit 10A-10B, in accordance with some example embodiments. Separate from and/or in combination with the phase calculations depicted in the example of FIG. 4 (above), the gain calculations depicted in the example of FIG. 5 may produce one or more gain output values 502A-502N. Each gain output value 502A-502N may be provided to (e.g., output to) a corresponding element arm of the beam-forming integrated circuit. For example, each gain output value 502A-502N may be output to and/or provided to a corresponding element arm 310, 320, 330, 340 of the beam-forming integrated circuit. Each gain output value 502A-502N may be provided to the trim control circuit (e.g., 302A-302D) and/or the gain control circuit (e.g., 314, 324, 334, 344) of the corresponding element arm. The gain output values 502A-502N may modify (e.g., offset or adjust) the gain of a signal transmitted and/or received by the corresponding element arm. In other words, the phase output values 408A-408N depicted in the example of FIG. 4 may modify the phase of the signal, whereas the gain output values 502A-502N may modify the gain of the signal.

The gain calculations depicted in the example of FIG. 5 may be performed, for example, by the digital control block 304 of the beam-forming integrated circuit. The digital control block may receive, e.g., from the beam-forming controller 16, a beam-steering message. The digital control block may obtain, from the beam-steering message, one or more beam-steering addresses 516A-516D. The digital control block may use the beam-steering addresses 516A-516D to obtain, from the beam-forming command register 206, one or more gain command values.

The beam-forming integrated circuit may include the factory calibration memory 202, the array calibration memory 204, and/or the beam-forming command register 206. Alternatively and/or additionally, the digital control block (which may be included in the beam-forming integrated circuit) may include the factory calibration memory 202, the array calibration memory 204, and/or the beam-forming command register 206.

The beam-forming command register 206 may store one or more banks of gain command values. Each bank of gain command values may be associated with a desired beam characteristic of the antenna array. For example, to steer (e.g., direct or point) the beam to a particular point in space, the beam-forming command register 206 may include a first bank of gain command values. To steer the beam to a different point in space, the beam-forming command register 206 may include a second bank of gain command values. Each bank of gain command values may include one or more gain command values corresponding to each element arm of the beam-forming integrated circuit. Each bank of gain command values may be associated with a particular beam-steering address.

As noted, the digital control block may obtain, e.g., from a beam-steering message, one or more beam-steering addresses 516A-516D. The digital control block may, based on each beam-steering address 516A-516D, select a bank of gain command values stored in the beam-forming command register 206. The digital control block may, based on the selected bank of gain command values, obtain one or more gain command values from the beam-forming command register 206. The digital control block may calculate the gain output values 502A-502N as a combination (e.g., a sum) of the gain command values, array calibration gain offsets from the array calibration memory 204, and/or other factors. The other factors may include nominal gain values from a nominal gain register 510, temperature compensation values from a temperature compensation register 508, factory calibration gain offsets from the factory calibration memory 202, and/or the like. The digital control block may provide (e.g., output) the calculated gain output values 502A-502N to the corresponding element arm of the beam-forming integrated circuit.

For example, digital control block may obtain, based on the beam-steering address 516A, a gain command value 514 from a bank of gain command values stored in the beam-forming command register 206. The digital control block may calculate the gain output 502A as a sum of the gain command value 514, an array calibration gain offset value 518 from the array calibration memory 204, and/or other factors. The other factors may include a nominal gain value 512 from the nominal gain register 510, a temperature compensation value from the temperature compensation register 508, a factory calibration gain offset value 506 from the factory calibration memory 202, and/or the like.

In some examples, the nominal gain register 510 may store nominal gain values that correspond to each channel of the beam-forming integrated circuit. The nominal gain value may be referred to as a default gain for the corresponding channel. The beam-forming integrated circuit may receive, e.g., from the beam-forming controller, the nominal gain values stored in the nominal gain register 510. The beam-forming integrated circuit may receive the nominal gain values at any time during or after the manufacture of the beam-forming integrated circuit. For example, the beam-forming integrated circuit may receive the nominal gain values during initialization and/or calibration of the antenna array. As noted, the digital control block may include the nominal gain values as part of the calculation of the gain output values 502A-502N.

In some examples, the temperature compensation register 508 may store one or more temperature compensation values. The same temperature compensation value may be used across all channels of the beam-forming integrated circuit. Alternatively and/or additionally, temperature compensation register 508 may include a temperature compensation values specific to each channel of the beam-forming integrated circuit. The beam-forming integrated circuit may receive, e.g., from the beam-forming controller, the temperature compensation values stored in the temperature compensation register 508. The beam-forming integrated circuit may receive, e.g., from the beam-forming controller, the temperature compensation values in a temperature compensation message. Alternatively and/or additionally, the beam-forming integrated circuit may receive, e.g., from the beam-forming controller the temperature compensation values at any time during or after the manufacture of the beam-forming integrated circuit, such as during initialization and/or calibration of the antenna array. As noted, the digital control block may include the temperature compensation values as part of the calculation of the gain output values 502A-502N.

Figure 6:
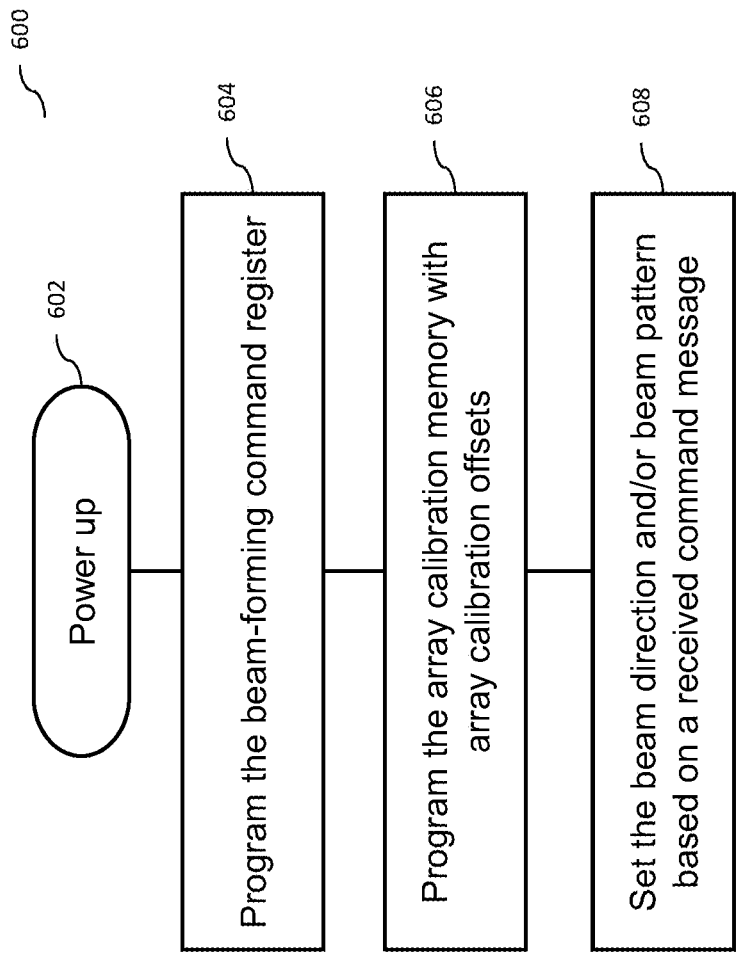
FIG. 6 illustrates an example of a process, in accordance with some example embodiments.

FIG. 6 depicts an example flow diagram of a process 600, in accordance with some example embodiments. At 602, power may be applied to the active electronically steered antenna system 100, including the beam-forming integrated circuit 10A-10B, the beam-forming controller 16, and the signal distribution system 14.

At 604, the beam-forming controller 16 may program the beam-forming command register 206 of each beam-forming integrated circuit of the active electronically steered antenna system. The beam-forming command register 206 may include one or more gain command banks and one or more phase command banks. Each gain command bank may include one or more gain command values associated with a corresponding antenna element of the antenna array. Each phase command bank may include one or more phase command values associated with a corresponding antenna element of the antenna array.

At 606, the beam-forming controller 16 may program the array calibration memory 204 of the beam-forming integrated circuit with array-level calibration offsets. The array-level calibration offsets may include a phase offset and/or a gain offset for each antenna element of the antenna array. As noted with respect to FIG. 2, the array calibration offsets may be produced by an array-level calibration process.

At 608, the beam-forming integrated circuit may set the beam direction and/or beam pattern based on a received command message. The beam-forming integrated circuit may receive the command message from the beam-forming controller 16. The beam-forming command message may include a command to switch between beam directions, beam patterns, and/or the like. The beam-forming integrated circuit may receive, e.g., from the beam-forming controller 16, a broadcast switching command message. The broadcast switching command message may include a beam-switching address. The beam-forming integrated circuit may use the beam-switching address to select, from the beam-forming command register 206, a phase register bank. As noted above with respect to FIGS. 4 and 5, the beam-forming integrated circuit may, based on the command message, the contents of the beam-forming command register, and the contents of the array calibration memory, modify (e.g., adjust or offset) the phase and/or gain of a signal transmitted and/or received by one or more antenna elements coupled to the beam-forming integrated circuit.

Figure 7:
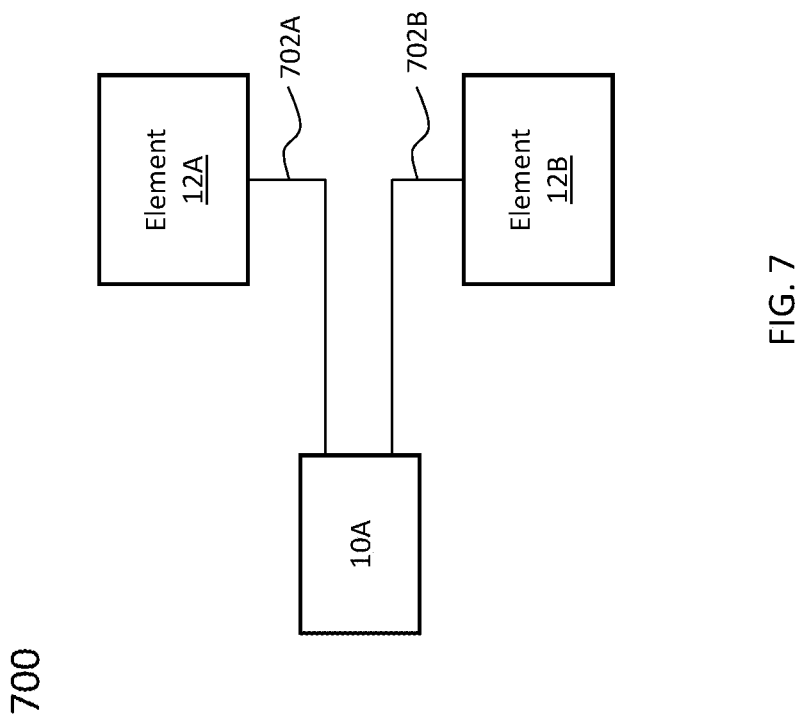
FIG. 7 illustrates an example layout of a portion of an active electronically steered antenna array, in accordance with some example embodiments.

FIG. 7 depicts an example layout 700 of an active electronically steered antenna array, in accordance with some example embodiments. In the example of FIG. 7, the beam-forming integrated circuit 10A is coupled to the first antenna element 12A via a first feed line 702A. The beam-forming integrated circuit 10A is also coupled to the second antenna element 12B via a second feed line 702B. As shown in the example of FIG. 7, the first feed line 702A is coupled to the bottom of the first antenna element 12A, and the second feed line 702B is coupled to the top of the second antenna element 12B. As such, the feed line orientation of the first antenna element 12A is the opposite of the feed line orientation of the second antenna element 12B. Due to this difference in the feed line orientations, a signal transmitted by the first antenna element 12A may be 180 degrees out of phase relative to the phase of a signal transmitted by the second antenna element 12B. Because the two signals are 180 degrees out of phase, the two signals may cancel each other out. According to some example embodiments, the beam-forming controller may store, in the array calibration memory 204, phase offsets that compensate for differences in the feed line orientations between one or more antenna elements in the antenna array. In the example of FIG. 7, the beam-forming controller may store, in the array calibration memory 204, a first phase offset corresponding to the first antenna element 12A and a second phase offset corresponding to the second antenna element 12B. Because the antenna elements 12A, 12B have opposite feed line orientations, a difference between first phase offset and the second phase offset may be 180 degrees. As noted with respect to FIG. 4, during operation of the antenna array, the beam-forming integrated circuit 10A may include the phase offsets from the array calibration memory 204 to control the output phase of signals provided to the antenna elements 12A-12B. As such, the beam-forming integrated circuit 10A may compensate for differences in the feed line orientations of the antenna array elements 12A-12B.

The active electronically steered antenna array may include any number of beam-forming integrated circuits, and each beam-forming integrated circuit may be coupled to any number of antenna array elements. Each antenna element may have any line feed orientation relative to the other antenna elements in the array. As such, the difference between any two phase offset values stored in the array calibration memory 204 may take on any value between −180 degrees and +180 degrees.

As used herein, generating may refer to the generation of a radio-wave signal or may refer to the modification of a radio-wave signal that was originally generated by another circuit and/or device.

Although some specific examples are disclosed herein, they are merely examples as other types of circuits and component values may be used as well, including sizing of components, differences in the logic circuits implementing the control, and/or the like.

Figure 8:
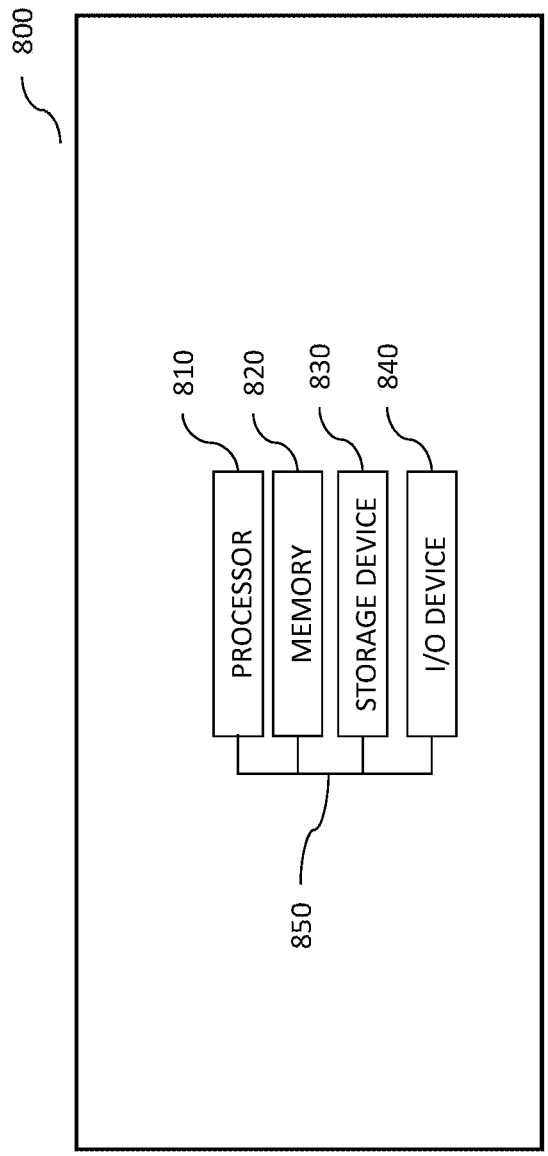
FIG. 8 illustrates an exemplary system, according to some example embodiments.

In some implementations, the current subject matter can be configured to be implemented in a system 800, as shown in FIG. 8. For example, any of the components described or depicted herein. The system 800 can include a processor 810, a memory 820, a storage device 830, and an input/output device 840. Each of the components 810-440 can be interconnected using a system bus 850. The processor 810 can be configured to process instructions for execution within the system 800. In some implementations, the processor 810 can be a single-threaded processor. In alternate implementations, the processor 810 can be a multi-threaded processor or a graphics processor unit (GPU). The processor 810 can be further configured to process instructions stored in the memory 820 or on the storage device 830, including receiving or sending information through the input/output device 840. The memory 820 can store information within the system 800. In some implementations, the memory 820 can be a computer-readable medium. In alternate implementations, the memory 820 can be a volatile memory unit. In yet some implementations, the memory 820 can be a non-volatile memory unit. The storage device 830 can be capable of providing mass storage for the system 800. In some implementations, the storage device 830 can be a computer-readable medium. In alternate implementations, the storage device 830 can be a floppy disk device, a hard disk device, an optical disk device, a tape device, non-volatile solid-state memory, or any other type of storage device. The input/output device 840 can be configured to provide input/output operations for the system 800. In some implementations, the input/output device 840 can include a keyboard and/or pointing device. In alternate implementations, the input/output device 840 can include a display unit for displaying graphical user interfaces.

In some embodiments, the current subject matter relates to an electronically steerable antenna apparatus. The apparatus may include a plurality of channels including a first channel. Each of the plurality of channels may be coupled to a respective antenna element. Each of the plurality of channels may include a trim control circuit and a phase control circuit. The first channel may be coupled to a first respective antenna element. The apparatus may also include an array calibration memory storing a plurality of phase offsets including a first phase offset. Each of the plurality of phase offsets may include an array level calibration phase offset corresponding to a respective channel of the plurality of channels. The first phase offset corresponding to the first channel of the plurality of channels. At least one of the trim control circuit of the first channel and the phase control circuit of the first channel may be configured to modify a phase of a first signal provided to and/or received from the first respective antenna element. The phase of the first signal being modified based at least in part on the first phase offset.

In some example embodiments, the current subject matter may include one or more of the following optional features. Each of the plurality of channels may include a gain control circuit. The array calibration memory may store a plurality of gain offsets including a first gain offset, each of the plurality of gain offsets comprising an array level calibration gain offset corresponding to a respective channel of the plurality of channels. The first gain offset may correspond to the first channel of the plurality of channels. Each of the plurality of channels may include a gain control circuit, the trim control circuit of the first channel, and/or the gain control circuit of the first channel being configured to modify a gain of the first signal provided to and/or received from the first respective antenna element. The gain of the first signal may be further modified based at least in part on the first gain offset.

In some example embodiments, the apparatus may also include at least one processor and at least one memory including computer program code configured to receive, from a calibration system, a plurality of array level calibration vectors, each of the plurality of array level calibration vectors including a phase offset and a gain offset corresponding to a respective channel of the plurality of channels, and store, in the array level calibration memory, the plurality of calibration vectors.

Figure 9:
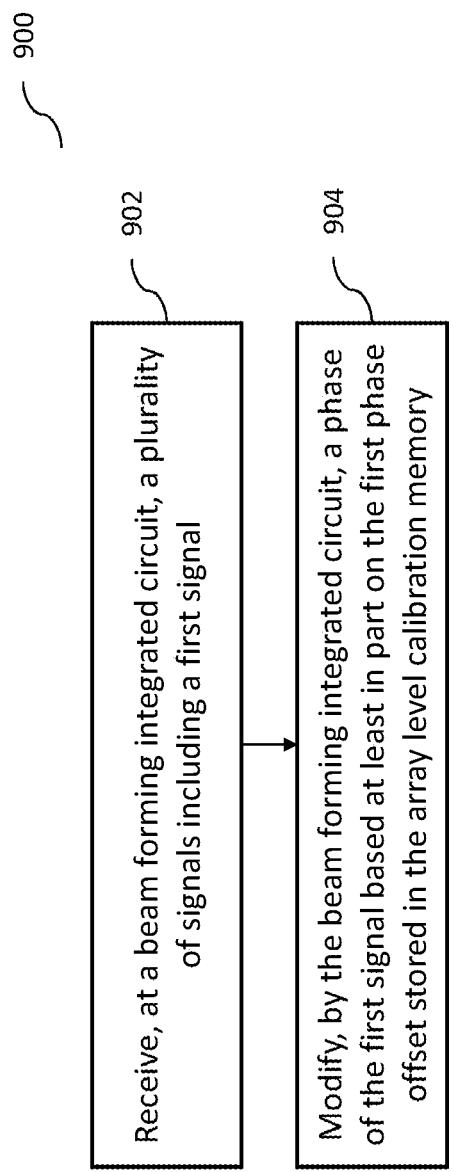
FIG. 9 illustrates an exemplary method, according to some example embodiments.

FIG. 9 illustrates an exemplary process 900 that may be performed by one or more example embodiments of the apparatus and/or system disclosed herein. At 902, a plurality of signals including a first signal may be received at a beam forming integrated circuit. The beam forming integrated circuit may include a plurality of channels including a first channel. Each of the plurality of signals may be received from and/or provided to a respective channel of the plurality of channels. Each of the plurality of channels may be coupled to a respective antenna element. The first channel may be coupled to a first respective antenna element. The beam forming integrated circuit may include an array level calibration memory. The array level calibration memory may include a plurality of phase offsets including a first phase offset. Each of the plurality of phase offsets may include an array level calibration phase offset corresponding to a respective channel of the plurality of channels. The first phase offset may correspond to the first channel of the plurality of channels.

At 904, a phase of the first signal may be modified by the beam forming integrated circuit based at least in part on the first phase offset stored in the array level calibration memory.

In some example embodiments, the current subject matter may include one or more of the following optional features. The array calibration memory may store a plurality of gain offsets including a first gain offset. Each of the plurality of gain offsets may include an array level calibration gain offset corresponding to a respective channel of the plurality of channels. The first gain offset may correspond to the first channel of the plurality of channels. The process may further include modifying, by the beam forming integrated circuit, based at least in part on the first gain offset, a gain of the first signal provided to and/or received from the first respective antenna element. The process may also include receiving, at the beam forming integrated circuit from a calibration system, a plurality of array level calibration vectors, each of the plurality of array level calibration vectors comprising a phase offset and a gain offset corresponding to a respective channel of the plurality of channels, and storing, by the beam forming integrated circuit, in the array level calibration memory, the plurality of calibration vectors.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively, or additionally, store such machine instructions in a transient manner, such as for example, as would a processor cache or other random access memory associated with one or more physical processor cores.

To provide for interaction with a user, one or more aspects or features of the subject matter described herein can be implemented on a computer which may access a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. An apparatus comprising:
a plurality of channels including a first channel, each of the plurality of channels being coupled to a respective antenna element, each of the plurality of channels comprising a trim control circuit and a phase control circuit, the first channel being coupled to a first respective antenna element; and
an array calibration memory storing a plurality of phase offsets including a first phase offset, each of the plurality of phase offsets comprising an array level calibration phase offset corresponding to a respective channel of the plurality of channels, the first phase offset corresponding to the first channel of the plurality of channels, at least one of the trim control circuit of the first channel and the phase control circuit of the first channel being configured to modify a phase of a first signal provided to and/or received from the first respective antenna element, the phase of the first signal being modified based at least in part on the first phase offset.

2. The apparatus of claim 1, wherein each of the plurality of channels further comprises a gain control circuit.

3. The apparatus of claim 1, wherein the array calibration memory further stores a plurality of gain offsets including a first gain offset, each of the plurality of gain offsets comprising an array level calibration gain offset corresponding to a respective channel of the plurality of channels.

4. The apparatus of claim 3, wherein the first gain offset corresponds to the first channel of the plurality of channels, wherein each of the plurality of channels further comprises a gain control circuit, the trim control circuit of the first channel, and/or the gain control circuit of the first channel being configured to modify a gain of the first signal provided to and/or received from the first respective antenna element, wherein the gain of the first signal is further modified based at least in part on the first gain offset.

5. The apparatus of claim 1 wherein the apparatus further comprises:
at least one processor; and
at least one memory including computer program code configured to, with the at least one processor, cause the apparatus to at least:
receive, from a calibration system, a plurality of array level calibration vectors, each of the plurality of array level calibration vectors comprising a phase offset and a gain offset corresponding to a respective channel of the plurality of channels; and
store, in the array calibration memory, the plurality of array level calibration vectors.

6. A method, comprising:
receiving, at a beam forming integrated circuit, a plurality of signals including a first signal, the beam forming integrated circuit comprising a plurality of channels including a first channel, each of the plurality of signals being received from and/or provided to a respective channel of the plurality of channels, each of the plurality of channels being coupled to a respective antenna element, the first channel being coupled to a first respective antenna element, the beam forming integrated circuit further comprising an array calibration memory, the array calibration memory comprising a plurality of phase offsets including a first phase offset, each of the plurality of phase offsets comprising an array level calibration phase offset corresponding to a respective channel of the plurality of channels, the first phase offset corresponding to the first channel of the plurality of channels; and
modifying, by the beam forming integrated circuit, a phase of the first signal based at least in part on the first phase offset stored in the array calibration memory.

7. The method of claim 6, wherein the array calibration memory further stores a plurality of gain offsets including a first gain offset, each of the plurality of gain offsets comprising an array level calibration gain offset corresponding to a respective channel of the plurality of channels.

8. The method of claim 7, wherein the first gain offset corresponds to the first channel of the plurality of channels, wherein the method further comprises:
modifying, by the beam forming integrated circuit, based at least in part on the first gain offset, a gain of the first signal provided to and/or received from the first respective antenna element.

9. The method of claim 6, further comprising:
receiving, at the beam forming integrated circuit from a calibration system, a plurality of array level calibration vectors, each of the plurality of array level calibration vectors comprising a phase offset and a gain offset corresponding to a respective channel of the plurality of channels; and
storing, by the beam forming integrated circuit, in the array calibration memory, the plurality of array level calibration vectors.

10. A non-transitory computer readable medium including computer program code which, when executed by at least one processor, cause operations comprising:
receiving, at a beam forming integrated circuit, a plurality of signals including a first signal, the beam forming integrated circuit comprising a plurality of channels including a first channel, each of the plurality of signals being received from and/or provided to a respective channel of the plurality of channels, each of the plurality of channels being coupled to a respective antenna element, the first channel being coupled to a first respective antenna element, the beam forming integrated circuit further comprising an array calibration memory, the array calibration memory comprising a plurality of phase offsets including a first phase offset, each of the plurality of phase offsets comprising an array level calibration phase offset corresponding to a respective channel of the plurality of channels, the first phase offset corresponding to the first channel of the plurality of channels; and
modifying, by the beam forming integrated circuit, a phase of the first signal based at least in part on the first phase offset stored in the array calibration memory.

11. The non-transitory computer readable medium of claim 10, wherein the array calibration memory further stores a plurality of gain offsets including a first gain offset, each of the plurality of gain offsets comprising an array level calibration gain offset corresponding to a respective channel of the plurality of channels.

12. The non-transitory computer readable medium of claim 11, wherein the first gain offset corresponds to the first channel of the plurality of channels, wherein the operations further comprises:
modifying, by the beam forming integrated circuit, based at least in part on the first gain offset, a gain of the first signal provided to and/or received from the first respective antenna element.

13. The non-transitory computer readable medium of claim 10, wherein the operations further comprise:
receiving, at the beam forming integrated circuit from a calibration system, a plurality of array level calibration vectors, each of the plurality of array level calibration vectors comprising a phase offset and a gain offset corresponding to a respective channel of the plurality of channels; and
storing, by the beam forming integrated circuit, in the array calibration memory, the plurality of array level calibration vectors.

* * * * *